(12) United States Patent
Park

(10) Patent No.: US 6,532,210 B2
(45) Date of Patent: Mar. 11, 2003

(54) DISK-TYPE RECORDING MEDIUM HAVING A CRACK HINDERING ELEMENT

(75) Inventor: Jun-min Park, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/001,993

(22) Filed: Dec. 5, 2001

(65) Prior Publication Data

US 2002/0075794 A1 Jun. 20, 2002

(30) Foreign Application Priority Data

Dec. 20, 2000 (KR) ........................ 2000-79012

(51) Int. Cl.[7] ................................................ G11B 5/84
(52) U.S. Cl. ....................................................... 369/282
(58) Field of Search ............................ 369/282, 98.01, 369/291, 271, 280; 360/98.01

(56) References Cited

U.S. PATENT DOCUMENTS 5,272,581 A * 12/1993 Kojima et al. ........... 360/98.01
5,987,003 A * 11/1999 Yokota ........................ 369/280
5,999,513 A * 12/1999 Arakawa et al. ............ 369/282

* cited by examiner

*Primary Examiner*—Allen Cao
(74) *Attorney, Agent, or Firm*—Staas & Halsey LLP

(57) ABSTRACT

A disk-type recording for protection of media recording and/or reproduction units, including an information recording surface portion disposed around a center hole and a crack hindering element to hinder the generation of a crack at the center hole from advancing to an outer edge of the disk-type recording media. The crack hindering element includes at least one annular protrusion portion protruded around the center hole.

34 Claims, 5 Drawing Sheets

DISK-TYPE RECORDING MEDIUM HAVING A CRACK HINDERING ELEMENT

CROSS-REFERENCE TO RELATED APPLICATIONS

This application claims the benefit of Korean Application No. 2000-79012, filed on Dec. 20, 2000, in the Korean Industrial Property Office, the disclosure of which is incorporated herein by reference.

BACKGROUND OF THE INVENTION

1. Field of the Invention

The present invention relates to a disk-type recording medium, and more particularly to a disk-type recording medium capable of limiting breakage caused by a crack formed around a center hole of the disk-type recording medium.

2. Description of the Related Art

Recently, the use of disk-type recording media such as optical disks or magneto-optical disks have become common in optical or magnetic optical signal recording/reproducing methods. These disk-type recording media can be divided into three kinds of recording media: read only memory type recording media like compact disks; one-time recording type recording media, which allows a user to record data once; and over-writing recording media, like optical disks.

Referring to FIGS. 1A and 1B, a disk-type recording medium 1 includes an annular non-recording surface portion 1b formed around a center hole 1a and an annular information-recording surface portion 1c spreading around the non-recording surface portion 1b. To record and/or reproduce information in and/or from the disk-type recording medium 1, a user typically puts the disk-type recording medium 1 in a carrying device like a disk tray, to load the disk-type recording medium 1 in a disk player. Then, the center hole 1a of the disk-type recording medium 1 is loaded in a turntable 2 installed in the disk player, and the disk-type recording medium 1 is spun at a high speed by a spindle motor 3. During the high-speed spinning, a chucking unit prevents the disk-type recording medium 1 from being separated from the turntable 2. As described above, while the disk-type recording medium 1 is spun at high speed, information is recorded and/or reproduced in and/or from the information-recording surface portion 1c of the disk-type recording medium 1 by a recording/reproducing unit, such as an optical pickup device or an optical head.

Recently, the RPM (revolution per minute) of the spindle motor 3 has been increased due to the increase of information-recording density of the disk-type recording medium 1. Therefore, some problems regarding the high-speed spin of the disk-type recording medium 1 have been exposed. Among the problems, when the disk-type recording medium 1 is spun, due to its shearing, the disk-type recording medium 1 may break. Thus, with this increased spin speed, the sequential breakage of peripheral devices, like an optical pickup device, frequently happens. It is known that the breakage from shearing of the disk-type recording medium 1 is caused from a short length crack being formed around the center hole 1a of the disk-type recording medium 1, such as when a user unconsciously exerts a shock to the disk-type recording medium 1. If the crack is of a predetermined critical crack length, the internal stress on the disk-type recording medium 1, caused by a centrifugal force from the spin of the disk-type recording medium 1, transfers from the front end of the crack to the outer line of the disk-type recording medium 1, and finally causes the shearing of the disk-type recording medium 1. Moreover, a bending stress on the disk-type recording medium 1 by the centrifugal force is increased with the shearing of the disk-type recording medium 1, thereby causing the disk-type recording medium 1 to become deformed and distorted. Lastly, the crack also causes the chucking unit to become separated. Therefore, the separated chucking unit and the broken disk-type recording medium 1, due to the huge energy generated by the high-speed spin, collide with other peripheral devices of the disk player, causing critical damage to a product.

In addition, even though the crack may not fully reach the critical crack length, the possibility of fatigue fracture still remains.

SUMMARY OF THE INVENTION

To solve the above and other problems, it is an object of the present invention to provide a disk-type recording medium having an improved construction for hindering a crack generated in the disk-type recording medium from advancing to an outer edge of the disk-type recording medium.

Additional objects and advantages of the invention will be set forth in part in the description which follows and, in part, will be obvious from the description, or may be learned by practice of the invention.

To accomplish the above object and other objects, the disk-type recording medium may include an information recording surface portion disposed around a center hole and a crack hindering element hindering a crack generated around the center hole from advancing to an outer edge of the disk-type recording medium. The crack hindering element includes at least one annular protrusion portion around the center hole. In addition, the annular protrusion portion may have a bead shape, in a sectional view.

In addition, according to another aspect of the present invention, the disk-type recording medium of the present invention may include an information recording surface portion disposed around a center hole of the disk-type recording medium and a crack hindering element hindering a crack generated around the center hole from advancing to an outer edge of the disk-type recording medium. The crack hindering element may include at least one annular iron core embedded around the center hole.

Moreover, according to another aspect of the present invention, the disk-type recording medium of the present invention may include an information recording surface portion disposed around a center hole of the disk-type recording medium and a crack hindering element for hindering a crack generated around the center hole from advancing to an outer edge of the disk-type recording medium. The crack hindering element may include at least one annular taping member adhered to the area around the center hole, the annular taping member being made of a material different from a material of the information recording surface portion. The annular taping member may be made of a fiber material.

Additionally, according to another aspect of the present invention, the disk-type recording medium of the present invention may include an information recording surface portion disposed around a center hole of the disk-type recording medium and a crack hindering element for hindering a crack generated around the center hole from advancing to an outer edge of the disk-type recording medium. The crack hindering element may include a coating layer, with the coating layer being made of a certain material and disposed on an area around the center hole hindering a crack from generating. The coating layer may be made of a viscoelastic material.

Moreover, according to another aspect of the present invention, the disk-type recording medium of the present invention may include an information recording surface portion disposed around a center hole of the disk-type recording medium and a crack hindering element hindering a crack generated around the center hole from advancing to an outer edge of the disk-type recording medium. The crack hindering element may include an annular flange portion disposed around the center hole, the annular flange portion being thicker than the information recording surface portion.

BRIEF DESCRIPTION OF THE DRAWINGS

The above objects and advantages of the present invention will become more apparent and more readily appreciated from the following description of the preferred embodiments thereof with reference to the attached drawings in which.

DETAILED DESCRIPTION OF THE PREFERRED EMBODIMENTS

Figure 1A:
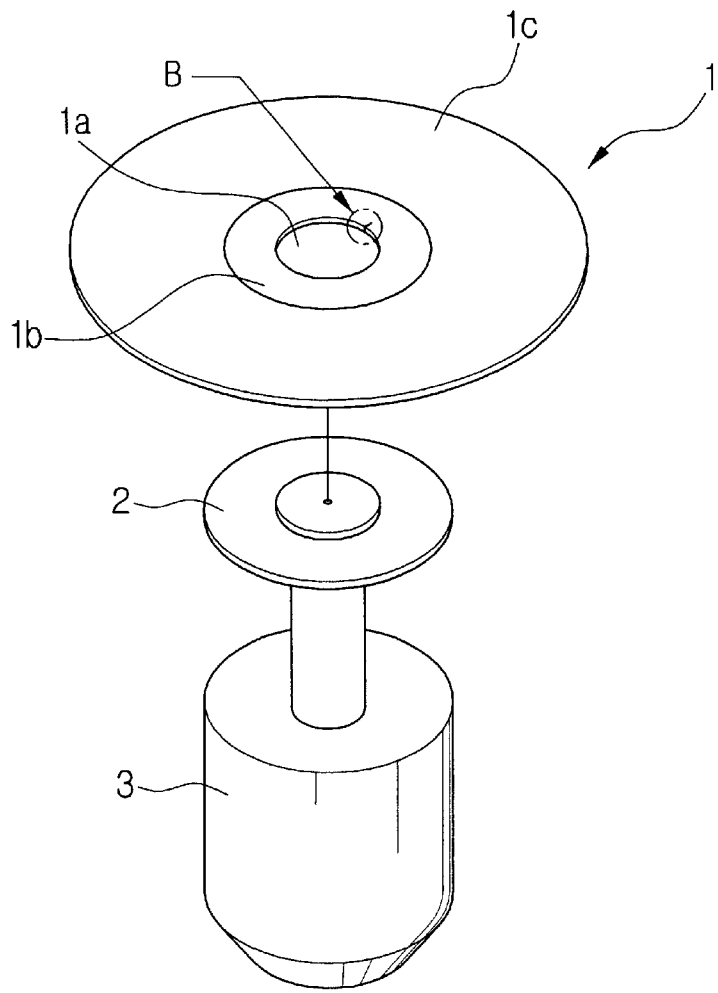
FIG. 1A shows a conventional recording/reproducing unit and a disk-type recording medium.
Figure 1B:
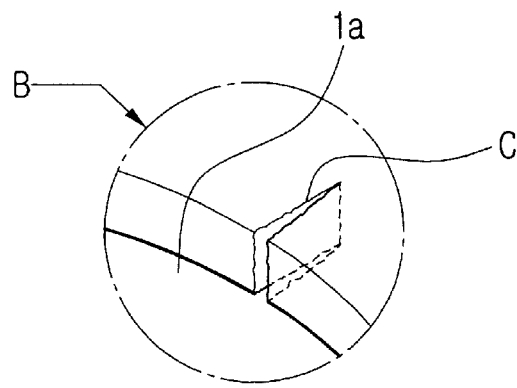
FIG. 1B shows an enlarged view of area B, of FIG. 1A, illustrating a crack in the disk-type recording medium.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2A:
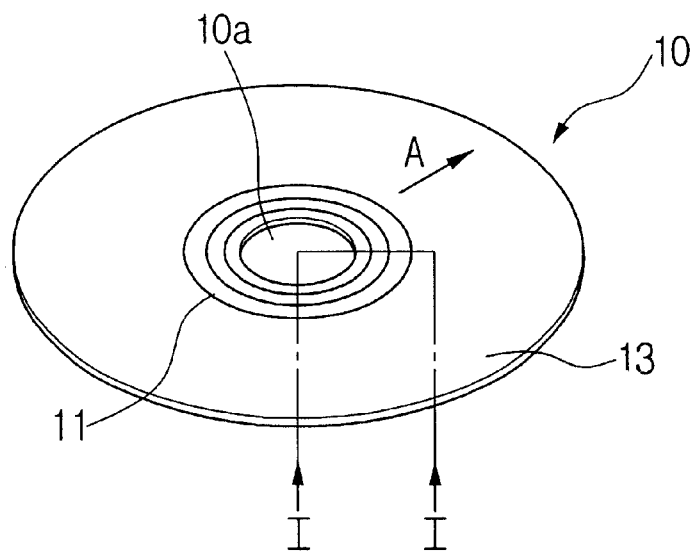
FIG. 2A shows a disk-type recording medium in accordance with a first embodiment of the present invention.

FIG. 2A shows a disk-type recording medium 10 according to a first embodiment of the present invention including a center hole 10a, an annular non-recording surface portion 11 disposed around the center hole 10a, an annular information recording surface portion 13, and a crack hindering element.

The non-recording surface portion 11 is an annular part formed from the center hole 10a to the information recording surface portion 13 of a predetermined length, and the information recording surface portion 13 is another annular part extending from the non-recording surface portion 11 to the edge of the disk-type recording medium 10. A concentric circle type or whirl type track is formed in the information surface portion 13 for recording information. Information is recorded and/or reproduced in and/or from the track according to an optical or a magnetic optical method by a recording/reproducing unit, such as an optical pickup (not shown) or magnetic head (not shown). The method of using the recording/reproducing unit to record data in the information recording surface portion 13 is generally known, and thus will be omitted herein.

The disk-type recording medium 10 of the above construction mainly includes polycarbonate as its main material. The polycarbonate material is of a kind of heat-processed plastic with good mechanical features, such as ultra-lightness, translucency, surface gloss, and flexible processability.

Figure 2B:
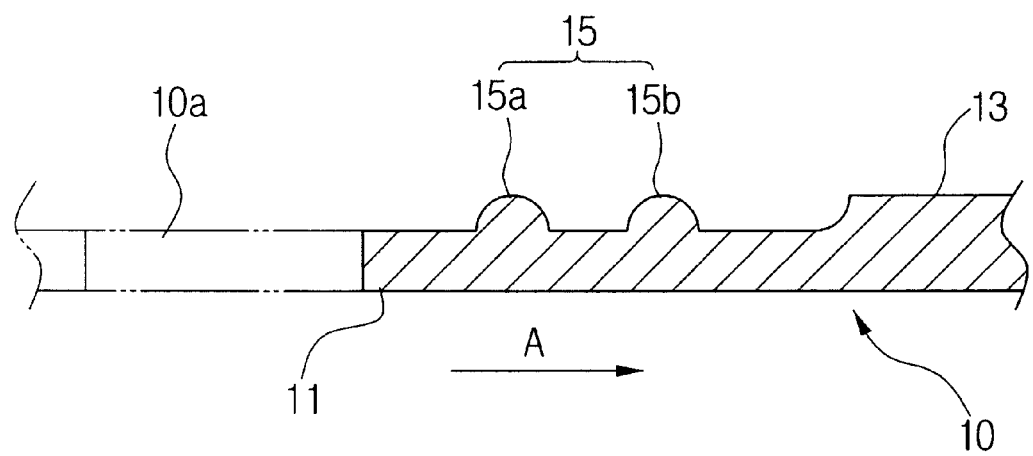
FIG. 2B shows a sectional perspective of a crack hindering element of the disk-type recording medium, along the line I—I of FIG. 2A.

The purpose of the crack hindering material is to prevent a crack from advancing to the outer side of the disk-type recording medium 10 when the crack occurs around the center hole 10a. The crack hindering element, as shown in FIG. 2B, includes a protrusion portion 15 protruded from the surface of the non-recording surface portion 11 around the center hole 10a. The annular protrusion portion 15 is formed around the center hole 10a, and integrally formed as one body with the non-recording surface portion 11. Preferably, as illustrated in FIG. 2B, a pair of protrusions 15a and 15b may be disposed at positions of predetermined distances from the center hole 10a, on the non-recording surface portion 11. Therefore, when the crack advances from the center hole 10a to the outer side of the disk-type recording medium, the advancement of the crack is primarily blocked or slowed down by a first protrusion 15a, and the crack is once more blocked or slowed down by a second protrusion portion 15b. Accordingly, the advancement of the crack can be effectively hindered. In addition, the first and second protrusions 15a and 15b may have a bead type cross-section to more efficiently prevent the advance of the crack.

Figure 3A:
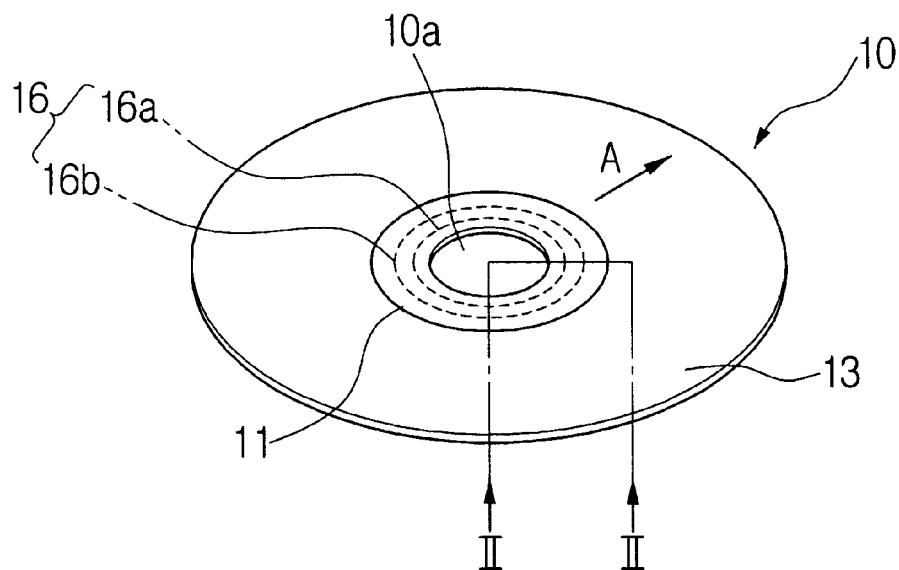
FIG. 3A shows a disk-type recording medium in accordance with a second embodiment of the present invention.
Figure 3B:
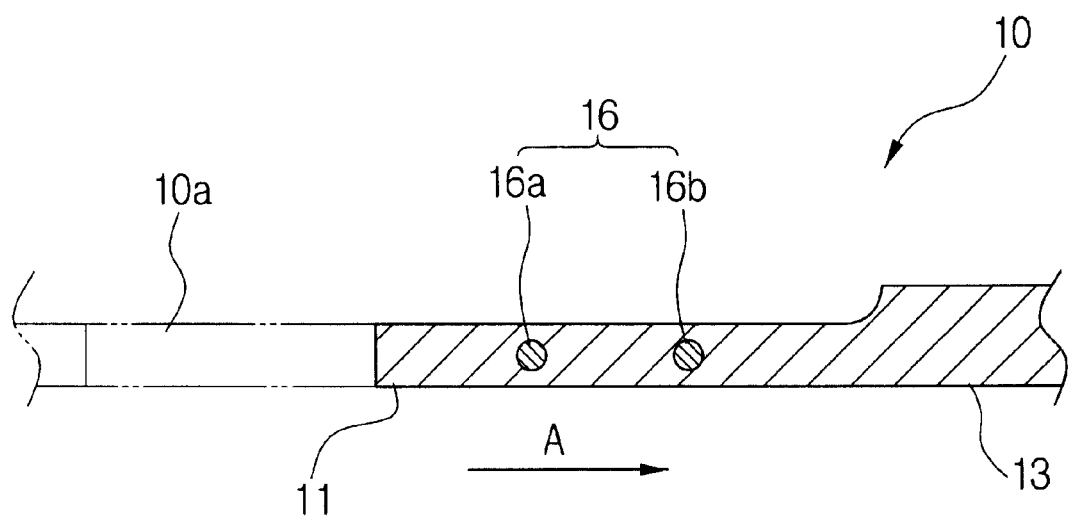
FIG. 3B shows a sectional perspective of a crack hindering element of the disk-type recording medium, along the line II—II line of FIG. 3A.

FIGS. 3A and 3B show a disk-type recording medium 10 according to a second embodiment, including annular iron cores 16 disposed on the non-recording surface portion 11 around the center hole 10a as the crack hindering element. The annular iron cores 16 include a first iron core 16a and a second iron core 16b disposed at the outer side of the center hole 10a. Each iron core 16 may be in the shape of a ring and embedded into the non-recording surface portion 11 by an inserted molding method, for example. A crack generated around the center hole 10a reaches each iron core 16a and 16b during its advancement to the outer direction A, the iron cores 16 spread the stress of the crack and do not allow the crack to advance further. Therefore, the disk-type recording medium 10 may have a semi-permanent life span. Preferably, the iron cores 16 may have smaller diameters than the thickness of the non-recording surface portion 11, to be entirely embedded in the disk-type recording medium 10.

Figure 4A:
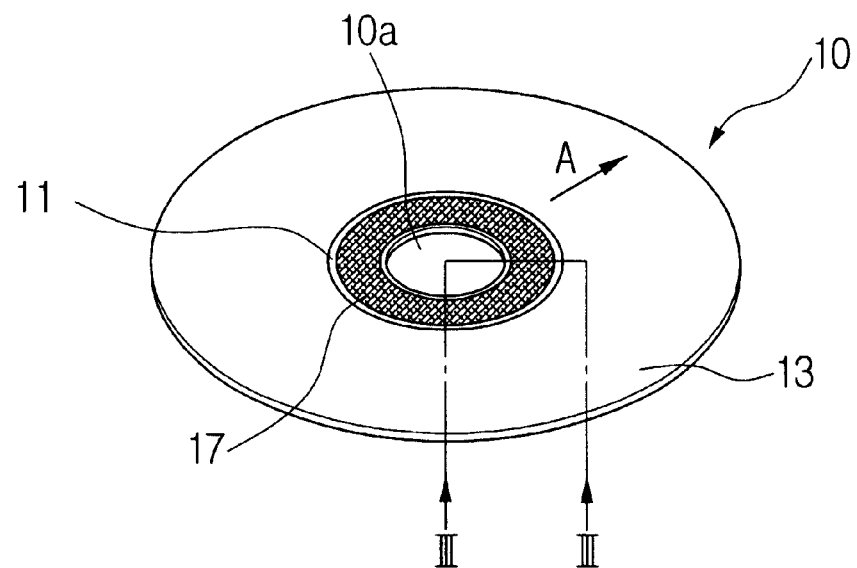
FIG. 4A shows a disk-type recording medium in accordance with a third embodiment of the present invention.
Figure 4B:
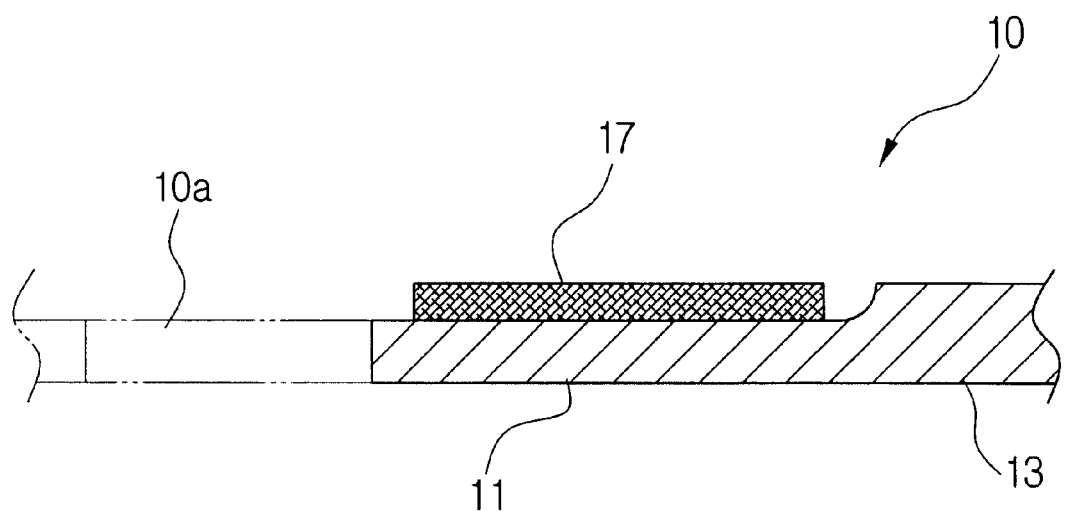
FIG. 4B shows a sectional perspective of a crack hindering element of the disk-type recording medium, along the line III—III of FIG. 4A.

FIGS. 4A and 4B show a disk-type recording medium 10 according to a third embodiment of the present invention, including a taping member 17 disposed around the center hole 10a as the crack hindering element. The taping member 17 is preferably made of a material different from the non-recording surface portion 11, such as a fiber material having stability against shearing or breakage. The annular taping member 17 may cover a predetermined area of the non-recording surface portion 11 and may be adhered on the non-recording surface portion 11 by an adhesive like bond.

In addition, a plurality of annular taping members 17 can be disposed around the center hole 10a at predetermined distances. The taping member 17 not only hinders a crack generated in the inner circumference of the center hole 10a from advancing to the outer side of the disk-type recording medium, but also prevents shearing and breakage, caused by an outside shock to the disk-type recording medium, from occurring.

Figure 5:
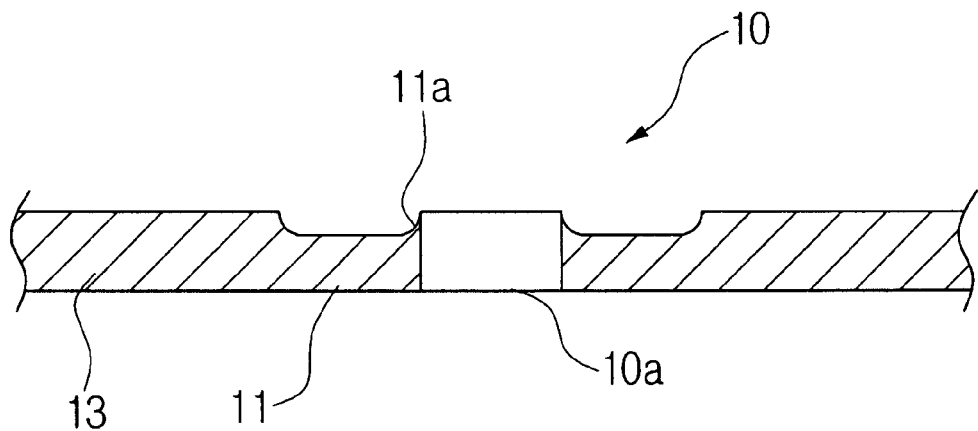
FIG. 5 shows a disk-type recording medium in accordance with a fourth embodiment of the present invention having a flange portion as the crack hindering element.

Furthermore, FIG. 5 shows a disk-type recording medium 10 according to a fourth embodiment of the present invention, including a flange portion 11a being disposed as the crack hindering element at the outline of the center hole 10a, with the flange portion 11a being thicker than the thickness of the non-recording surface portion 11. The annular flange portion 11a is disposed around the entire edge of the center hole 10a and formed higher than at least one side of the non-recording surface portion 11. The flange portion 11a basically hinders a crack from occurring at the inner circumference of the center hole 10a and prevents a generated crack from advancing to the outer side of the disk-type recording medium 10.

Figure 6:
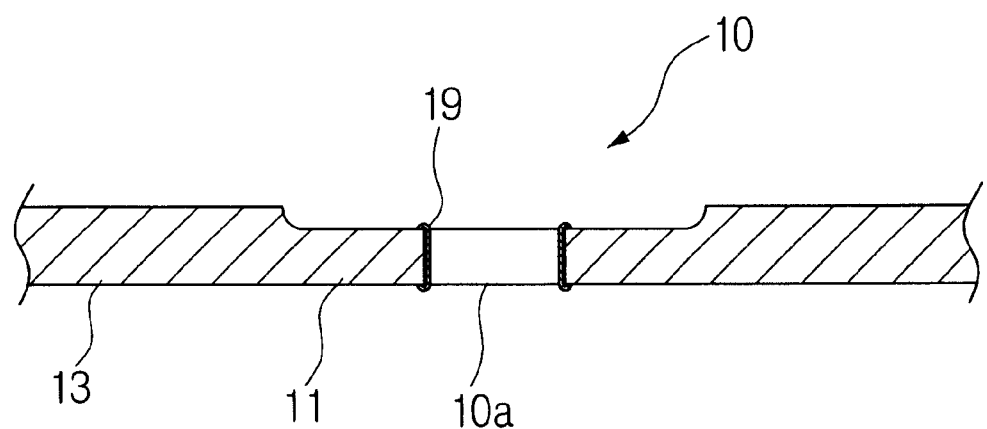
FIG. 6 shows a disk-type recording medium in accordance with a fifth embodiment of the present invention having a coating layer as the crack hindering element.

In addition, FIG. 6 shows a disk-type recording medium 10 according to a fifth embodiment of the present invention, including a coating layer 19, of a predetermined thickness, disposed around the inner circumference of the center hole 10a as the crack hindering element. The coating layer 19 may be coated on the inner circumference of the center hole 10a and some upper and lower parts of the non-recording surface portion 11. Preferably, the coating layer 19 is a viscoelastic material having tolerances against fracture and shearing. The material can be rubber, acryl, nylon, ABS material, and PC material. By disposing the coating layer 19 around the inner circumference of the center hole 10a with a material different from the recording medium 10, the generation of a crack around the inner circumference of the center hole 10a can be easily prevented. Even when a crack is generated on the coating layer 19, it cannot advance further from the boundary between the inner circumference of the center hole 10a and the coating layer 19.

As described so far, the disk-type recording medium 10 according to the present invention has a crack hindering element on the non-recording surface portion 11, whereby even when a crack occurs around the inner circumference of the center hole 10a, the crack cannot advance further to the outer side of the disk-type recording medium 10. Comparatively, in a conventional disk-type recording medium, the stress is centralized at the front end of a crack by a centrifugal force, whereas in embodiments of the present invention, since the cracked_ disk-type recording medium 10 includes a crack hindering element , the stress is dispersed by the crack hindering element, e.g., protrusion portion 15, the iron cores 16, and the taping member 17. Thus, in embodiments of the present invention, the crack cannot advance further. In addition, due to the included crack hindering element, shearing of the disk-type recording medium 10 can be minimized. Further, although a crack may be generated in the disk-type recording medium 10 due to a user's mishandling, shearing and breakage of the disk-type recording medium 10 can be prevented. Thus, a user can use the disk-type recording medium 10 longer than previous conventional disk-type media. Lastly, embodiments of the present invention also prevent the breakage of the recording/reproducing units.

Further, as illustrated in FIGS. 5 and 6, by disposing the flange portion 11a or the coating layer 19 around the center hole 10a of the disk-type recording medium 10, the generation of cracks can easily be prevented.

Since the crack hindering element can prevent the disk-type recording medium from being sheared or deformed when it spins at a high speed, the life span of the disk-type recording medium may be expanded. Also, by preventing a disk player, which uses the disk-type recording medium, from being broken and out of order, user satisfaction can be increased.

As set forth above, the crack hindering element, for example the protrusion portion, taping member and the flange portion , have all been described as being disposed on one side of the disk-type recording medium, but the crack hindering element may also be disposed on the other side or both sides of the disk-type recording medium.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A media disk, comprising:
   a non-recording surface portion disposed around a center hole of the disk;
   an information recording surface portion disposed around the non-recording surface portion; and
   a crack hindering element formed in the non-recording surface portion to hinder the generation of a crack at the center hole from advancing to an outer edge of the disk, with the crack hindering element including at least one annular protrusion portion protruded around the center hole,
   wherein the at least one annular protrusion portion is not adjacent to the center hole but spaced a predetermined distance from the center hole.

2. The media disk of claim 1, wherein the annular protrusion portion has a cross-sectional bead shape.

3. The media disk of claim 1, wherein the crack hindering element includes two protrusion portions.

4. The media disk of claim 1, wherein the crack hindering element forms a continuous ring around the center hole.

5. The media disk of claim 1, wherein the crack hindering element is integrally formed as one body with the non-recording surface portion of the disk.

6. A media disk, comprising:
   a non-recording surface portion disposed around a center hole of the disk;
   an information recording surface portion disposed around the non-recording surface portion; and
   a crack hindering element formed in the non-recording surface portion hinder the generation of a crack at the center hole from advancing to an outer edge of the disk, with the crack hindering element including at least one annular iron core embedded around the center hole.

7. The media disk of claim 6, wherein the iron core has a cross-sectional bead shape.

8. The media disk of claim 6, wherein the crack hindering element includes two iron cores.

9. The media disk of claim 6, wherein the crack hindering element forms a continuous ring around the center hole.

10. The media disk of claim 6, wherein the crack hindering element is embedded in the non-recording surface portion of the disk according to an inserted molding method.

11. The media disk of claim 6, wherein the iron core has a smaller diameter than the thickness of the non-recording surface portion to be entirely embedded in the disk.

12. A media disk, comprising:
a non-recording surface portion disposed around a center hole of the disk;
an information recording surface portion disposed around the non-recording surface portion; and
a crack hindering element placed in the non-recording surface portion to hinder the generation of a crack at the center hole from advancing to an outer edge of the disk, with the crack hindering element including at least one annular taping member adhered to an area surrounding the center hole, the annular taping member being made of a material different from a material of the information recording surface portion.

13. The media disk of claim 12, wherein the taping member is made of a fiber material having stability against shearing or breakage.

14. The media disk of claim 12, wherein the taping member is adhered to the non-recording surface portion by an adhesive bond.

15. The media disk of claim 12, wherein the crack hindering element includes a plurality of taping members placed around the center hole at predetermined distances.

16. The media disk of claim 12, wherein the taping member covers a predetermined area of the non-recording surface portion.

17. A media disk, comprising:
a non-recording surface portion disposed around a center hole of the disk;
an information recording surface portion disposed around the non-recording surface portion; and
a crack hindering element generated in the non-recording surface portion to hinder the generation of a crack at the center hole from advancing to an outer edge of the disk, with the crack hindering element including a coating layer disposed on an area surrounding the center hole.

18. The media disk of claim 17, wherein the coating layer is made of a viscoelastic material having tolerances against fracture and shearing.

19. The media disk of claim 17, wherein the coating layer is made of a material different from a material forming the media disk.

20. The media disk of claim 17, wherein the coating layer is disposed on an inner circumference of the center hole.

21. The media disk of claim 17, wherein the coating layer is disposed on an upper surface of the non-recording surface portion.

22. The media disk of claim 17, wherein the coating layer is disposed on a lower surface of the non-recording surface portion.

23. The media disk of claim 17, wherein the coating layer is disposed on upper and lower surfaces of the non-recording surface portion.

24. The media disk of claim 20, wherein the coating layer is also disposed on upper and/or lower surfaces of the non-recording surface portion.

25. A media disk, comprising:
a non-recording surface portion disposed around a center hole of the disk;
an information recording surface portion disposed around the non-recording surface portion; and
a crack hindering element formed on the non-recording surface portion to hinder the generation of a crack at the center hole from advancing to an outer edge of the disk, with the crack hindering element including an annular flange portion disposed at an edge of the center hole, the annular flange portion being thicker than the non-recording surface portion.

26. The media disk of claim 25, wherein the flange portion is disposed continuously around the center hole edge.

27. The media disk of claim 25, wherein the flange portion is formed to extend beyond a surface of at least one side of the non-recording surface portion.

28. A recording/reproducing unit protection method, comprising: forming an annular element around a center hole of a disk to prevent a crack at the center hole from advancing to an outer edge of the disk and thereby preventing shearing of the disk upon a recording or reproduction of information by a recording and/or reproducing unit, wherein the annular element is formed in a non-recording portion of the disk and the annular element is formed by integrally forming at least one protrusion on the surface of the non-recording portion of the disk, with the at least one protrusion being formed not adjacent to the center hole but spaced a predetermined distance from the center hole.

29. A recording/reproducing unit protection method, comprising: forming an annular element around a center hole of a disk to prevent a crack at the center hole from advancing to an outer edge of the disk and thereby preventing shearing of the disk upon a recording or reproduction of information by a recording and/or reproducing unit, wherein the annular element is formed in a non-recording portion of the disk and by embedding a core into the non-recording portion of the disk.

30. The method of claim 29, wherein the embedding of the core is accomplished by an inserted molding method.

31. A recording/reproducing unit protection method, comprising: forming an annular element around a center hole of a disk to prevent a crack at the center hole from advancing to an outer edge of the disk and thereby preventing shearing of the disk upon a recording or reproduction of information by a recording and/or reproducing unit, wherein the annular element is formed in a non-recording portion of the disk and formed by adhering a taping member, made of a different material than the disk, to a surface of the non-recording portion of the disk.

32. A recording/reproducing unit protection method, comprising: forming an annular element around a center hole of a disk to prevent a crack at the center hole from advancing to an outer edge of the disk and thereby preventing shearing of the disk upon a recording or reproduction of information by a recording and/or reproducing unit, wherein the annular element is formed in a non-recording portion of the disk by coating a material onto at least one surface of the non-recording portion of the disk.

33. The method of claim 32, wherein the annular element is coated onto an inner edge of the center hole of the disk.

34. A media disk, comprising:
a non-recording surface portion disposed around a center hole of the disk;
an information recording surface portion disposed around the non-recording surface portion; and
an annular element formed in the non-recording portion of the disk, around the center hole, to prevent a crack at the center hole from advancing to an outer edge of the disk and to thereby prevent shearing of the disk, wherein the annular element is disposed on upper and lower surfaces of the media disk.

* * * * *